US012762155B2

(12) United States Patent
Wu

(10) Patent No.: US 12,762,155 B2
(45) Date of Patent: Oct. 13, 2026

(54) ACQUIRING KEY VALUE OF QUERY KEY

(71) Applicant: Dell Products L.P., Round Rock, TX (US)

(72) Inventor: Yurun Wu, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 19/067,677

(22) Filed: Feb. 28, 2025

(65) Prior Publication Data

US 2026/0211902 A1 Jul. 23, 2026

(30) Foreign Application Priority Data

Jan. 17, 2025 (CN) ......................... 202510084672.3

(51) Int. Cl.
*G06F 16/28* (2019.01)
*G06F 16/22* (2019.01)
*G06F 16/2455* (2019.01)

(52) U.S. Cl.
CPC ........ *G06F 16/285* (2019.01); *G06F 16/2246* (2019.01); *G06F 16/2455* (2019.01)

(58) Field of Classification Search
CPC . G06F 16/285; G06F 16/2455; G06F 16/2246
See application file for complete search history.

(56) References Cited

U.S. PATENT DOCUMENTS 10,838,940 B1 * 11/2020 Wu ..................... G06F 16/2255
11,074,196 B1 * 7/2021 Aleti ................... G06F 12/0866
12,632,436 B1 * 5/2026 Tracey ................ G06F 16/2272
2017/0316042 A1 * 11/2017 She ...................... G06F 16/2282
2021/0158176 A1 * 5/2021 Wan ..................... G06F 16/3334
2021/0248107 A1 * 8/2021 Hou ....................... G06F 3/0652
2021/0294807 A1 * 9/2021 Fu ........................ G06F 16/9027
2024/0118939 A1 * 4/2024 Kondiles ........... G06F 16/24532
2025/0156392 A1 * 5/2025 Garcia-Arellano ... G06F 16/285
2025/0322018 A1 * 10/2025 Wu ...................... G06F 16/9024

OTHER PUBLICATIONS

Kraska, et al. "The Case for Learned Index Structures" arXiv:1712.01208v3 [cs. DB], [https://arxiv.org/abs/1712.01208] Apr. 30, 2018, 30 pages.

* cited by examiner

*Primary Examiner* — Huawen A Peng
(74) *Attorney, Agent, or Firm* — Amin, Turocy & Watson, LLP

(57) ABSTRACT

The present disclosure relates to acquiring a key value of a query key. An example method includes determining a page table and a page identifier (ID) corresponding to the query key based on an attribute of the query key, and determining a storage address for a page corresponding to the page ID based on the page table and the page ID. A storage address for the query key can be acquired based on the query key and the page at the storage address. In addition, the key value of the query key can be acquired based on the storage address for the query key. In this way, direct look-up of the query key in the storage space is avoided, the complexity of the look-up is reduced, and the metadata overhead of the key value storage and the execution time of the search of the query key are reduced.

20 Claims, 9 Drawing Sheets

ACQUIRING KEY VALUE OF QUERY KEY

RELATED APPLICATION

The present application claims the benefit of priority to Chinese Patent Application No. 202510084672.3, filed on Jan. 17, 2025, which application is hereby incorporated into the present application by reference herein in its entirety.

TECHNICAL FIELD

The present application relates to the field of computers, and, for example, to acquiring a key value of a query key.

BACKGROUND

The index structure of data includes a range index, a hash index, a bitmap index, a full-text index, and the like. In application, the index structure to be adopted is usually decided according to the characteristics of the data. The range index structure may be used to deal with the data retrieval involving some range in data query efficiently. It can quickly locate and access the data that meets a condition within a certain range, rather than retrieve only a single specific value.

Common types of range index structure are B-tree (balanced multi-way search tree) and B+-tree (balanced multi-way look-up tree). Internal nodes of a B+-tree store index keys to guide a look-up path, and leaf nodes store actual data records or pointers to the data records. During the range query, because of the ordering of leaf nodes and the linked list structure, the records within the range can be efficiently traversed. B-tree may also be used for range index. However, its internal nodes store both index and data, making it slightly less efficient than B+-tree in range query.

SUMMARY

Example embodiments of the present application provide a method, a device, and a computer program product for acquiring a key value of a query key.

According to a first example embodiment of the present application, a method for acquiring a key value of a query key is provided, the method including determining a page table and a page identifier ID corresponding to the query key based on an attribute of the query key. The method includes determining a storage address for a page corresponding to the page ID based on the page table and the page ID. The method further includes determining a storage address for the query key based on the query key and the page at the storage address. In addition, the method further includes acquiring the key value of the query key based on the storage address for the query key.

According to a second example embodiment of the present application, an electronic device is provided, including at least one processor and coupled to the at least one processor and having instructions stored therein. The instructions, when executed by the at least one processor, cause the electronic device to perform actions including determining a page table and a page identifier ID corresponding to the query key based on an attribute of the query key. The actions include determining a storage address for a page corresponding to the page ID based on the page table and the page ID. The actions further include determining a storage address for the query key based on the query key and the page at the storage address. In addition, the actions further include acquiring the key value of the query key based on the storage address for the query key.

According to a third example embodiment of the present application, a computer program product is provided, which is tangibly stored on a non-volatile computer-readable medium and includes machine-executable instructions. The machine-executable instructions, when executed, cause a machine to perform actions including determining a page table and a page identifier ID corresponding to the query key based on an attribute of the query key. The actions include determining a storage address for a page corresponding to the page ID based on the page table and the page ID. The actions further include determining a storage address for the query key based on the query key and the page at the storage address. In addition, the actions further include acquiring the key value of the query key based on the storage address for the query key.

It should be understood that what is described in this Summary section is neither intended to define key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. Throughout the accompanying drawings, the same or similar reference numerals represent the same or similar elements, and in the accompanying drawings.

DETAILED DESCRIPTION

Figure 1:
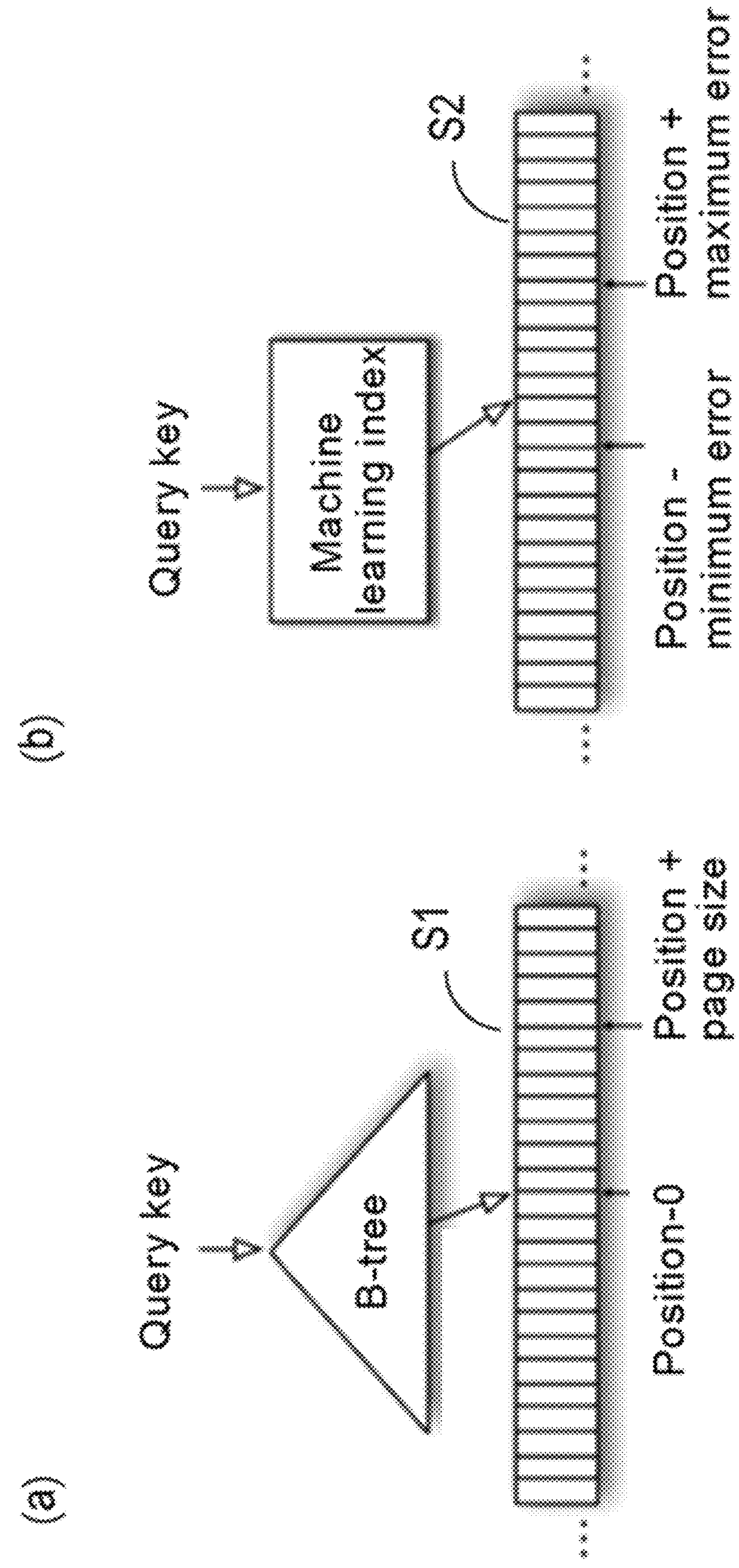
FIGS. 1(*a*) and 1(*b*) are schematic diagrams showing a B-tree look-up mode and a machine learning model look-up mode, respectively.

Example embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for exemplary purposes only, and are not intended to limit the scope of protection of the present disclosure.

In the description of the embodiments of the present disclosure, the terms "include," "have," and the like should be understood as open-ended inclusion, that is, "including but not limited to." The term "based on" should be understood as "based at least in part on." The terms "embodiment," "one embodiment," or "this embodiment" should be understood as "at least one embodiment".

As used herein, unless explicitly stated otherwise, the term "or" covers all possible combinations, unless not feasible. For example, if it is stated that a component may include A or B, unless otherwise explicitly stated or not feasible, the component may include A, or B, or A and B. As a second example, if it is stated that a component may include A, B, or C, unless otherwise explicitly stated or not feasible, the component may include A, or B, or C, or A and B, or A and C, or B and C, or A and B and C.

As mentioned above, although the B+-tree index structure is relatively efficient in data query, it has the disadvantage of wasting the internal space of nodes in terms of space occupation. For example, the B+-tree nodes need to reserve a certain amount of space to maintain balance and facilitate the insertion and deletion operations. Split operations are required before the nodes are full, which may lead to underutilization of some of the space. In addition, when storing the index key values, in order to maintain the ordering of the node structure, there may be some space for arrangement of the pointers and key values, and even if the volume of data does not fill a node, such space will be occupied. In addition, the B+-tree index structure also has the disadvantage of storage redundancy. For example, leaf nodes of the B+-tree store data records (or pointers to data records), and internal nodes store index key values. As the index key values of the internal nodes are actually a copy of the data key values of the leaf nodes, this causes some data redundancy. This redundancy may take up a large amount of storage space in the case of a great volume of data.

In view of this, the present disclosure provides various solutions for acquiring a key value of a query key. In example embodiments of the present disclosure, the identifier (ID) of a page where the query key is located and a page table to which the page belongs are found based on the attribute of the query key, and the storage address for the page where the query key is located is determined by using the page table and the page ID, thereby locking the key query into the page, and the query key is looked up in the page to acquire a corresponding key value. Using one or more of the example solutions, direct look-up for a query key in the storage space is avoided, the complexity of look-up is reduced, and the metadata overhead of key value storage and the execution time of search for a query key are reduced.

The simple principles and differences between B-tree indexing and machine learning indexing are described below in conjunction with FIG. 1. FIG. 1(*a*) and FIG. 1(*b*) are schematic diagrams showing the B-tree look-up mode and the machine learning model look-up mode, respectively. In FIG. 1(*a*), given a query key, the B-tree indexing (a model itself, except that the data is overfitted with a few operations) recursively partitions the key space using simple if statements and routes to a low-level page using a numerical index key dependent on a branching factor in a page, thereby giving the position (position-0) of the query key in a sorted array S1 while ensuring that the key recorded at that position is the first key to be equal to or greater than the query key (the range not exceeding position plus page size).

In FIG. 1(*b*), given a query key, machine learning indexing (e.g., a neural network) predicts the position of the query key in a sorted array S2 by using a machine learning model, the predicted position being within an interval including the position of the query key, e.g., the position of the query key minus a minimum error and the position of the query key plus a maximum error. This machine learning model can effectively approximate the cumulative distribution function (CDF) of a data set, and map positions of query keys by the following functional relationship:

$$p = F(\text{key})N \tag{1}$$

where p is the position of the query key "key," F (key) is a CDF that estimates the likelihood of observing a key less than or equal to the query key, and N is the total number of keys. Compared with B-tree indexing, the machine learning model can approximate the general shape of the CDF more efficiently, because it can use only a few real numbers to characterize the key distribution in the CDF.

Figure 2:
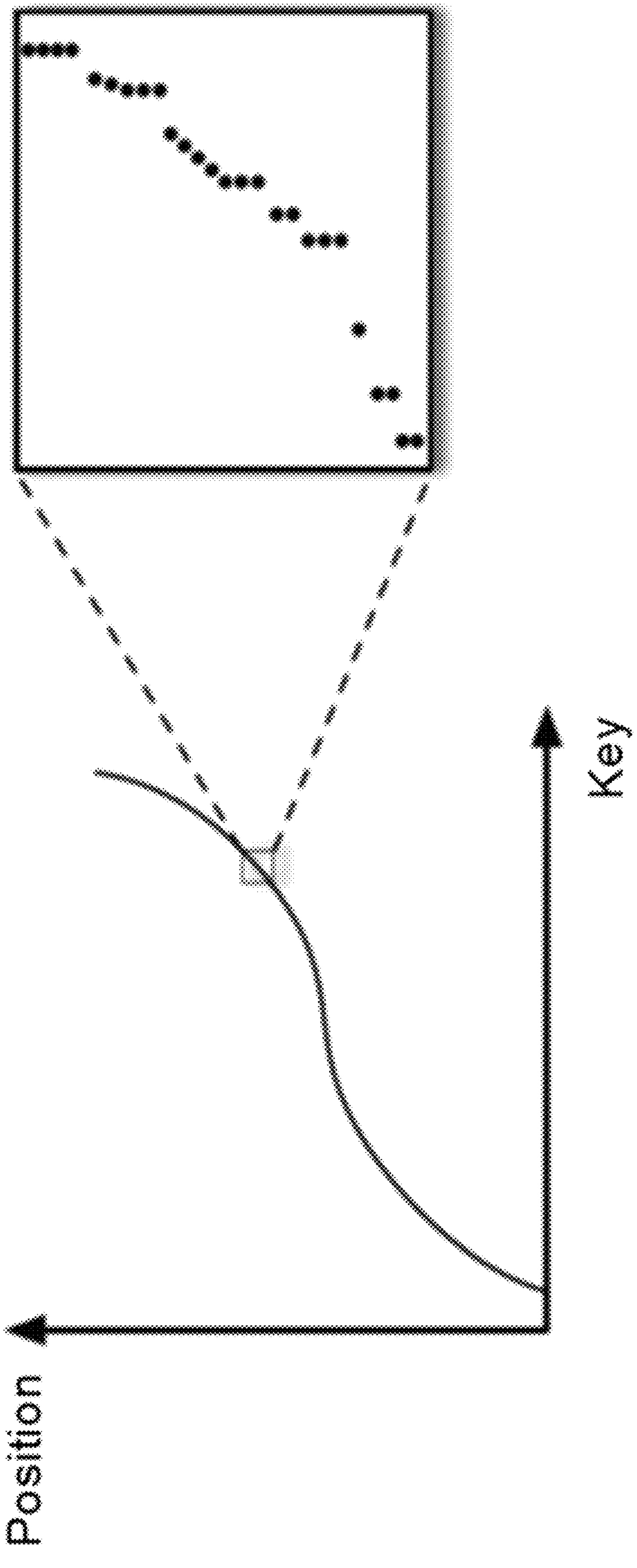
FIG. 2 shows a schematic diagram of the relationship between a key and a storage position for the key.

However, on the other hand, it is difficult for a machine learning model to guarantee accuracy at the level of a single data record. As shown in FIG. 1(*b*), the predicted position of the query key is not the actual position of the query key. FIG. 2 further illustrates this feature of the machine learning model. FIG. 2 shows a schematic diagram of the relationship between a key and a storage position of the key, and it can be seen that although the CDF function appears very smooth and regular, if zoomed in to a single record, more and more irregularities are shown, as represented by the irregular black dots in the enlarged view on the right.

Figure 3:
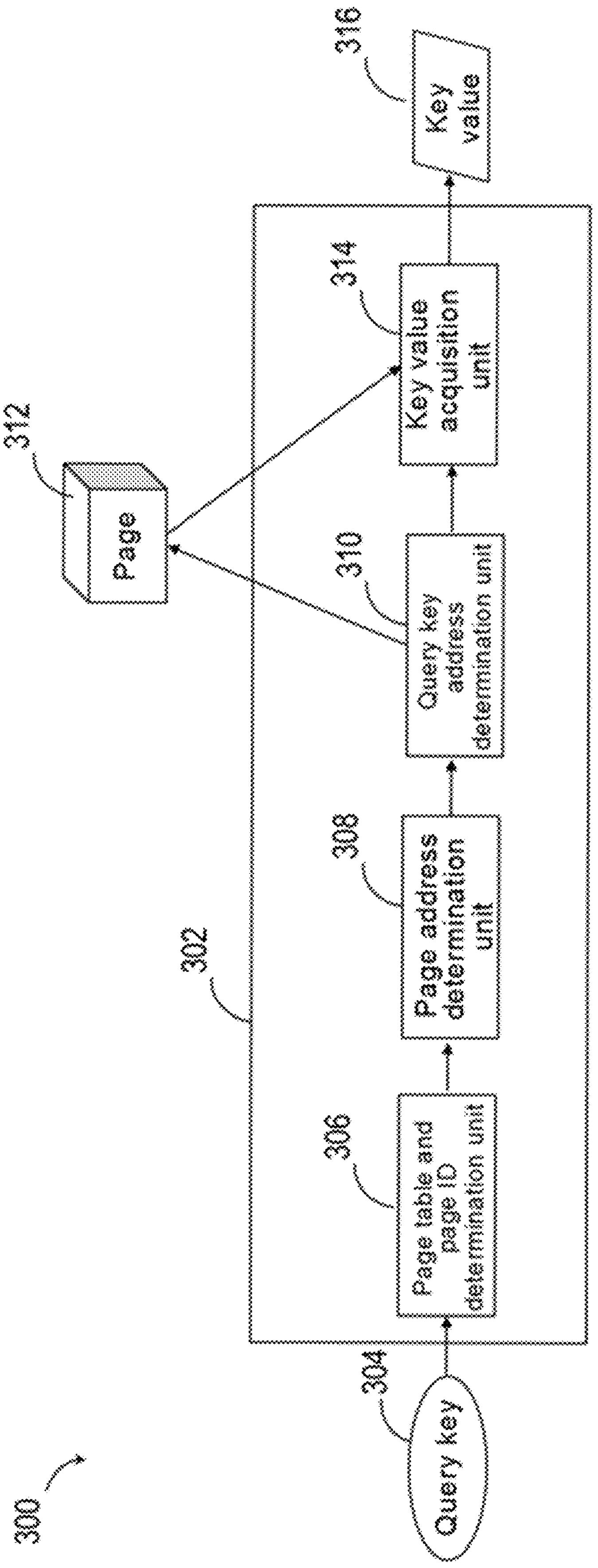
FIG. 3 shows a schematic diagram of an overall environment for implementing example embodiments of the present disclosure.

FIG. 3 shows a schematic diagram of an overall environment 300 for implementing some embodiments of the present disclosure. As shown in FIG. 3, the environment 300 includes a query key 304, a computing device 302, a page 312, and a key value 316. The computing device 302 includes a page table and page ID determination unit 306, a page address determination unit 308, a query key address determination unit 310, and a key value acquisition unit 314. The query key 304 is stored in the page 312, and the key value 316 is a key value corresponding to the query key 304.

The computing device 302 may include, but is not limited to, a personal computer, a server computer, a handheld or laptop device, a mobile device (such as a mobile phone, a personal digital assistant (PDA), and a media player), a multi-processor system, a consumer electronic product, a wearable electronic device, an intelligent home device, a minicomputer, a mainframe computer, an edge computing device, a distributed computing environment including any of the above systems or devices, and the like.

As shown in FIG. 3, the query key 304 is input to the page table and page ID determination unit 306 in the computing device 302, which determines a page ID of the page 312 in which the query key 304 is located and a page table to which the page 312 belongs based on an attribute (e.g., name, data type, size, etc.) of the query key 304, and the page address determination unit 308 determines a page address of the page 312 in which the query key 304 is located using the determined page ID and page table. The query key address determination unit 310 routes to the page 312 using the determined page address and performs a key query process in the page 312 to find a storage address for the query key 304, and the key value acquisition unit 314 retrieves a key value 316 associated with the query key 304 from the page 312 using the storage address and outputs the key value 316.

In some embodiments, the page table and page ID determination unit 306, the page address determination unit 308, and the query key address determination unit 310 may all include a machine learning model. For example, the page table and page ID determination unit 306 may include a machine learning model for predicting the page table to which the page 312 in which the query key 304 is located belongs and the page ID based on certain attributes of the query key 304. The page address determination unit 308 may include a machine learning model for predicting the storage address for the page 312 based on the page table and the page ID. The query key address determination unit 310 may include for predicting in which subspace in the page 312 the query key 304 is located based on certain attributes of the query key 304.

In this way, for example, by looking up the page table to which the page where the query key is located belongs and the page ID, direct key look-up in the storage space is avoided, the complexity of key look-up is reduced, and the metadata overhead of key value storage and the execution time of search for a query key are reduced.

Figure 4:
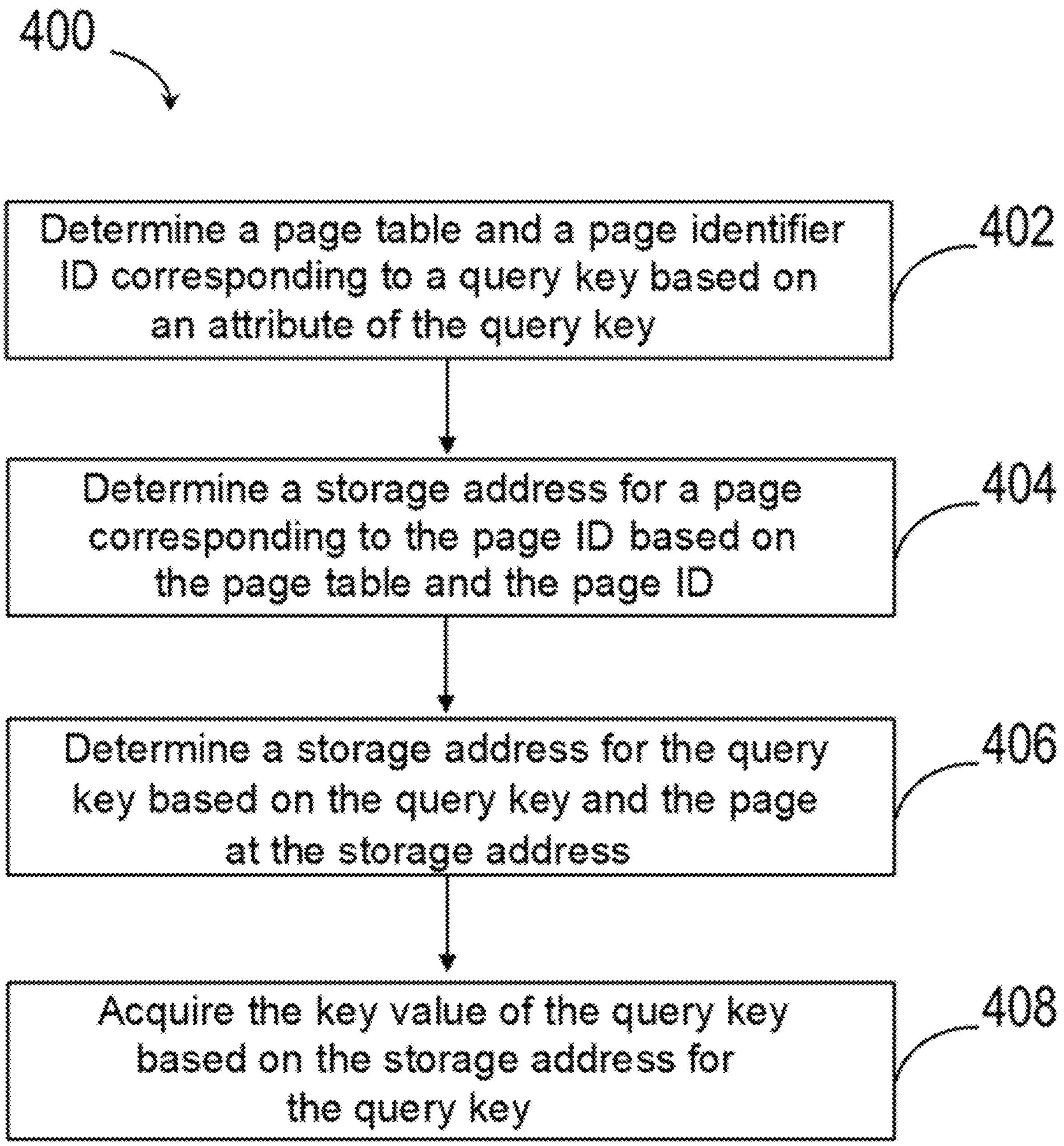
FIG. 4 shows a flow chart of a method for acquiring a key value of a query key according to some embodiments of the present disclosure.

FIG. 4 shows a flow chart of a method 400 for acquiring a key value of a query key according to some embodiments of the present disclosure. The method 400 may be performed in the computing device 302 in the environment 300 in FIG. 3. Furthermore, the numbering in the flow chart does not indicate the order in which these steps are executed, and some of or all these steps may be executed in parallel, or the execution order may be reversed, which is not limited in the present disclosure.

At block 402, the method 400 may include determining a page table and a page identifier ID corresponding to the query key based on an attribute of the query key. In some embodiments, as shown in FIG. 3, the page table and page ID determination unit 306 determines the page table and page identifier ID corresponding to the query key 304 based on the attribute of the query key 304. In some embodiments, the query key 304 may be, for example, a primary key in a database for uniquely identifying each row of records in a database table (e.g., in a student information table, a student's student number may be the primary key that can be used to perform an accurate query in the student information table when it is necessary to query all information for a particular student); a foreign key in a database for establishing an association between two tables whose value refers to the primary key in another table (e.g., in an order management system with an order table and a user table, the field "user ID" in the order table is a foreign key that refers to the primary key "user ID" in the user table); and a file name in a file system for identifying and distinguishing query keys for different files (the file system looks up for a file with a file name containing the keyword in the storage device, and once the file is found, the content of the file (such as words, charts, and other information in the file) is the corresponding key value); a cache key in a cache system for uniquely identifying data stored in the cache; and a keyword in a search engine, using a keyword input by a user as the query key.

At block 404, the method 400 may include determining a storage address for a page corresponding to the page ID based on the page table and the page ID. In some embodiments, as shown in FIG. 3, the page address determination unit 308 determines a storage address for the page 312 corresponding to the page ID based on the page table and the page ID. In some embodiments, the page 312 may be a page in a memory, which is the basic unit of memory management by the operating system. It divides the physical memory into blocks of equal size, and the size of these blocks is usually fixed. For example, in many systems, the page size may be 4 KB, 8 KB, etc. In some embodiments, the page 312 may alternatively be a page in a disk storage, in which the page is also commonly called a disk block and is the basic unit of I/O operations of the disk. Similar to the memory page, the disk page also divides the storage space of the disk into fixed-size blocks. This size is determined based on the physical characteristics of the disk and the design of the file system. A common disk page size may also be 4 KB, 8 KB, etc. When files are stored in the disk, they will be allocated and stored in units of disk pages.

At block 406, the method 400 may include determining a storage address for the query key based on the query key and the page at the storage address. In some embodiments, as shown in FIG. 3, the query key address determination unit 310 determines the storage address for the query key 304 based on the query key 304 and the page 312 where it is located. At block 408, the method 400 may include acquiring a key value of a query key based on the storage address for the query key. In some embodiments, as shown in FIG. 3, the key value acquisition unit 314 acquires the key value 316 of the query key 304 based on the storage address for the query key 304.

Through the method described in conjunction with FIG. 4, direct look-up for a query key in the storage space is avoided, the complexity of look-up is reduced, and the metadata overhead of key value storage and the execution time of look-up for a query key are reduced.

Figure 5:
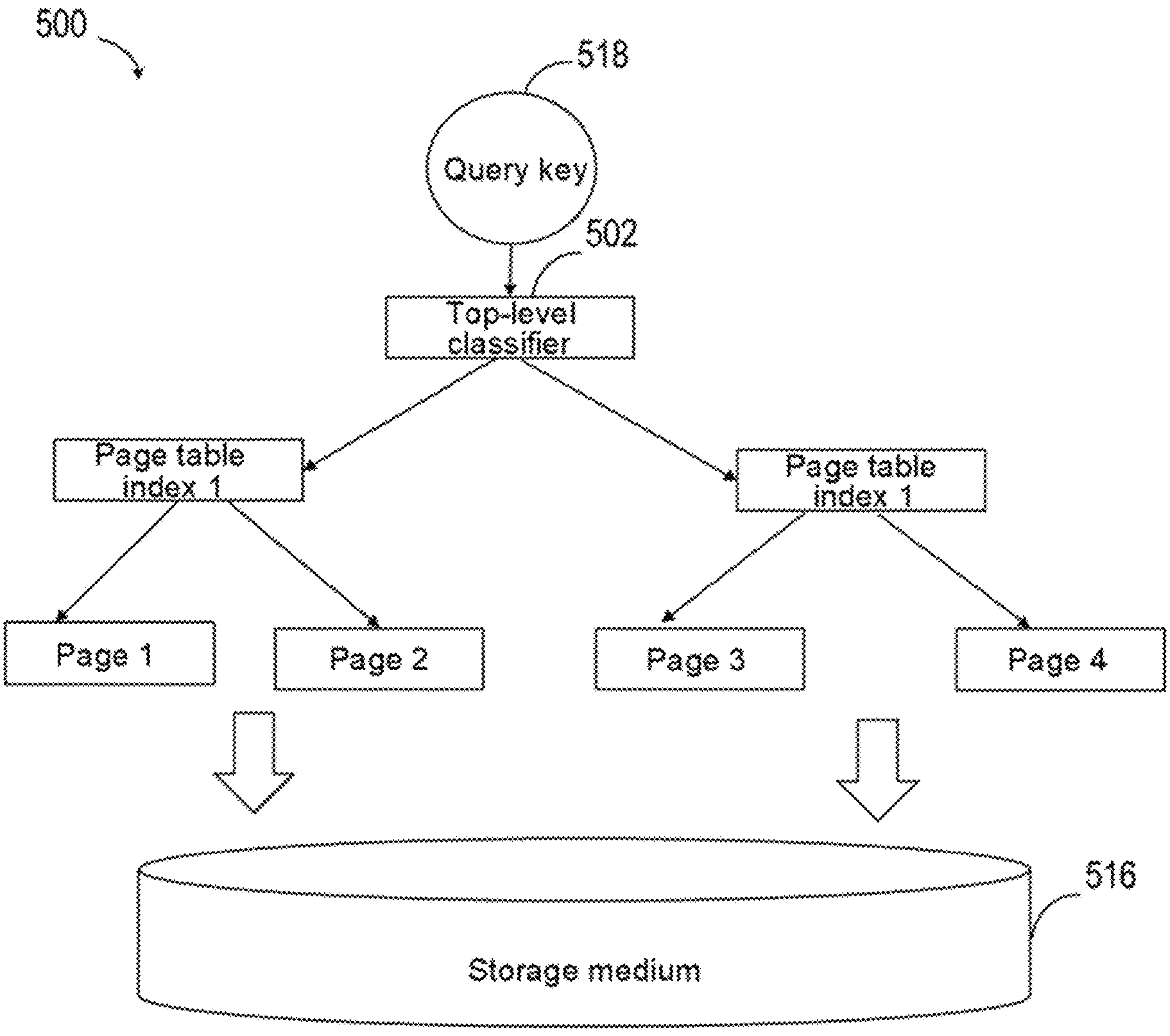
FIG. 5 shows a flow chart of an example of a page look-up portion according to some embodiments of the present disclosure.

The page look-up portion as a part of the key query process will be described below in conjunction with FIG. 5. FIG. 5 shows a flow chart of an example 500 of a page look-up portion according to some embodiments of the present disclosure. In the example 500, a top-level classifier 502 is trained to divide the total key space into sub-ranges based on some attributes of a key, and can route the key query to a sub-level index (e.g., a page table index) based on some attributes of a query key 518. For example, the top-level classifier 502 determines a page table index, such as a page table index 1 and a page table index 2, of the page table to which the page in which a query key 518 is located belongs based on some attributes of the query key 518. Using the page table index, key queries can be routed to different pages. For example, the query for the query key 518 may be routed to page 1 or page 2 using the page table index 1, and the query for the query key 518 may be routed to are all associated with a storage medium 516 (e.g., page 1 corresponds to page A and page B in the storage medium 516).

In some embodiments, the page table is a data structure used by the operating system to manage the mapping between a virtual memory and a physical memory, and consists of multiple page table entries. Each page table entry mainly contains the mapping information between virtual pages and physical pages. For example, a page table entry may record a physical page number corresponding to a virtual page number, the access right of a page (such as readable, writable, and executable), whether the page is present in the physical memory (the presence bit), and other information. When the processor issues a virtual memory access request, the memory management unit uses the page table for address translation. In some embodiments, the page table index 1 and the page table index 2 are used to quickly locate the page table entry corresponding to the page where the query key 518 is located in the page table, so as to speed up the address translation.

In some embodiments, the key attribute on which the top-level classifier 502 is based may be the data type itself of the key value. For example, if the key is of an integer type, the top-level classifier 502 may determine the page table index based on the integer range. For example, for a 32-bit integer key, the integer range may be divided into various intervals, and each interval corresponds to a page table index. The key attribute on which the top-level classifier 502 is based may alternatively be the length or size of the data type of the key value. For example, for a variable-length data type (such as a character string), the length attribute of the key may be used for classification. Assuming that a page stores character string keys of different lengths, the top-level classifier 502 may divide the pages into different page table indexes based on the character string lengths. For example, pages in which character string keys of a length less than 10 characters are attributed to one page table index, character string keys of a length of 10-20 characters are attributed to another index, and so forth.

In some embodiments, the key attribute on which the top-level classifier 502 is based may alternatively be a semantics related attribute of the key. For example, for a business related classification attribute, if the key is the product number and there are different categories of products, then the top-level classifier 502 may divide the page table index based on the semantic attribute of product category. For example, for a time related semantic attribute, if the key has a time attribute, such as a time stamp of a log file as the key, then the top-level classifier 502 may determine the page table index based on a time range (e.g., by day, by week, or by month).

In some embodiments, the key attribute on which the top-level classifier 502 is based may alternatively be a distribution related attribute of the key. For example, for a frequency distribution attribute, if some keys are frequently used, e.g., popular keys, while others are less frequently used, the top-level classifier 502 may divide the pages where the keys are located into various page table indexes based on the frequencies. For example, for a spatial distribution attribute, if the physical positions (in the space) of the keys in the storage system have certain regularity, the top-level classifier 502 may divide them based on the node position or storage area where the data is stored.

Figure 6:
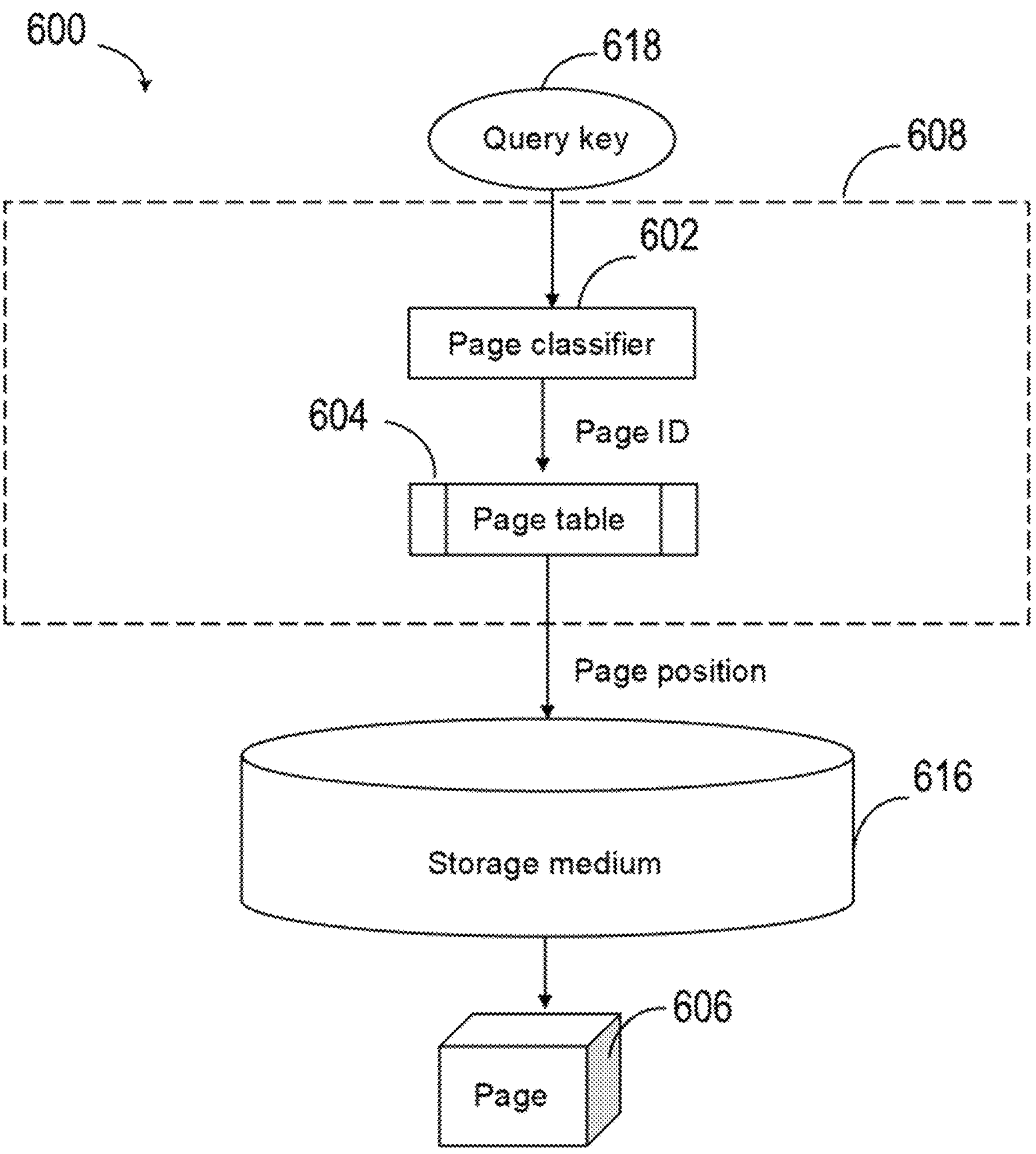
FIG. 6 shows a flow chart of another example of a page look-up portion according to some embodiments of the present disclosure.

The page table index is further described below in conjunction with FIG. 6. FIG. 6 shows a flow chart of another example 600 of a page look-up portion according to some embodiments of the present disclosure. In the example 600, a page table index 608 includes a page classifier 602 and a page table 604. The page classifier 602 is trained to route a key query to a page ID (e.g., page 1, page 2, etc.) based on some attributes of the query key 618, and the page table 604 may determine the page position of the page 606 where the key 618 is located in the storage medium 616 based on the page ID. In some embodiments, the page table 604 maps the page ID to a storage address for the page corresponding to (or associated with) the page ID. The attribute based on which the page classifier 602 classifies pages (classifies the pages into page 1, page 2, page 3, etc.) may be selected from the above examples of key attributes on which the top-level classifier 502 is based, or from other attributes not listed herein.

Through the method shown in the example 600, multiple key-value entries are grouped into one page, and the machine learning model is used to predict the page ID instead of a single key position, which can significantly reduce the number of entries in the page table 604, thereby reducing the overhead of the page table 604 in terms of space consumption and look-up delay. Moreover, for a given query key 618, it is much easier to predict the page ID of the key space covering thousands of keys than to directly predict the position of the query key.

Figure 7:
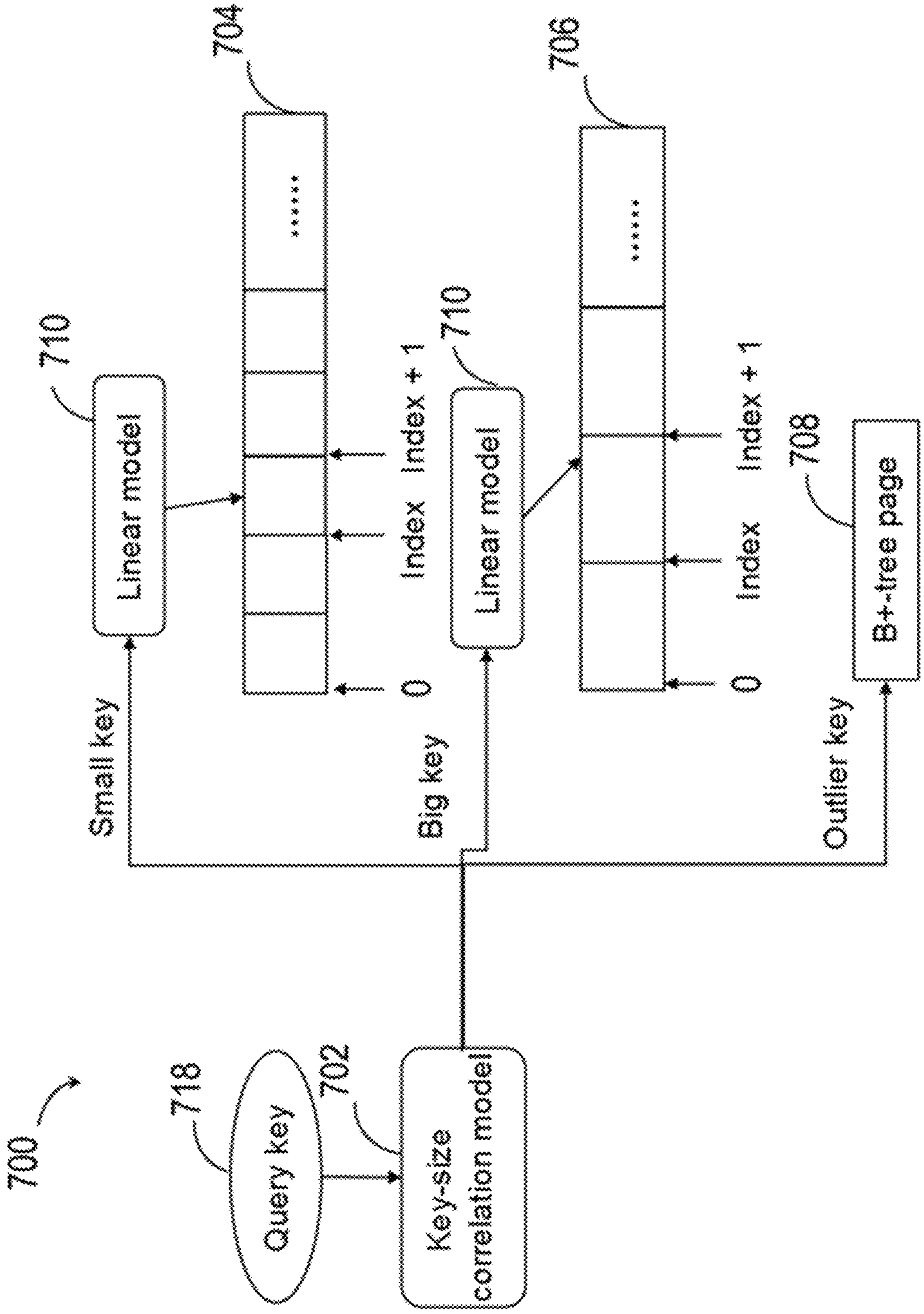
FIG. 7 shows a schematic diagram of an example of look-up for a key in a page according to some embodiments of the present disclosure.

The internal index structure of the page where the query key 718 is located will be described below in conjunction with FIG. 7. FIG. 7 shows a schematic diagram of an example 700 of looking up a key in a page according to some embodiments of the present disclosure. In the example 700, a key-size correlation model 702 is trained to extract the correlation between the key and the key size to predict the key size based on the key. For a query key 718, the key-size correlation model 702 predicts the size of the query key 718 based on some attributes of the query key 718 and classifies it into different classification groups. The key attribute based on which the key-size correlation model 702 makes the classification may be selected from the above examples of key attributes on which the top-level classifier 502 is based, or from other attributes not listed herein.

In some embodiments, if the prediction result is that the query key 718 is a small key, the key-size correlation model 702 routes the key query to a first classification group 704, and if the prediction result is that the query key 718 is a big key, the key-size correlation model 702 routes the key query to a second classification group 706. In some embodiments, both the first classification group 704 and the second classification group 706 have multiple fixed-size storage units, each of which stores one key value entry, and the keys of all the key value entries are arranged in order in the classification group.

In some embodiments, a linear model 710 predicts the estimated index of the query key 718 in the classification group based on some attributes of the query key 718. The key attributes used by the linear model 710 to predict the index of the query key 718 may be selected from the above examples of key attributes on which the top-level classifier 502 is based, or from other attributes not listed herein. The linear model 710 uses two pre-trained parameters, with the query key 718 as the independent variable, to give its estimated index in the classification group. Compared with the B-tree and B+-tree indexing, only two parameters of the linear model 710 need to be stored to determine the approximate position of the query key 718, thereby saving memory occupation and improving the execution speed of key query. The linear model 710 is shared by the first classification group 704 and the second classification group 706 because the keys in the classification groups are linearly distributed regardless of the size of the keys.

In some embodiments, the key at the estimated index is compared with the query key 718, and if the two are the same, the estimated index is determined as the index of the query key 718, so as to determine the storage position of the query key 718. If the two are different, the search continues around the estimated index until the query key 718 is found. If the query key 718 is not ultimately found in the correspond classification group, the key query is routed to a B+-tree page 708 in which look-up for the query key 718 is continued. The B+-tree page 708 is dedicated to storing keys that are not linearly distributed or keys having sizes that are irregular and difficult to predict.

Using the method shown in the example 700, the key-value entries are classified in the page as classification groups with different entry slot sizes and an outlier group, thereby speeding up the query by means of index prediction by the linear model 710, as well as minimizing model contamination and inaccuracy caused by irregular keys (the size or distribution of which is irregular) by introducing an outlier B+-tree page 708 and the ability to convert the model into a traditional B+-tree page.

Figure 8:
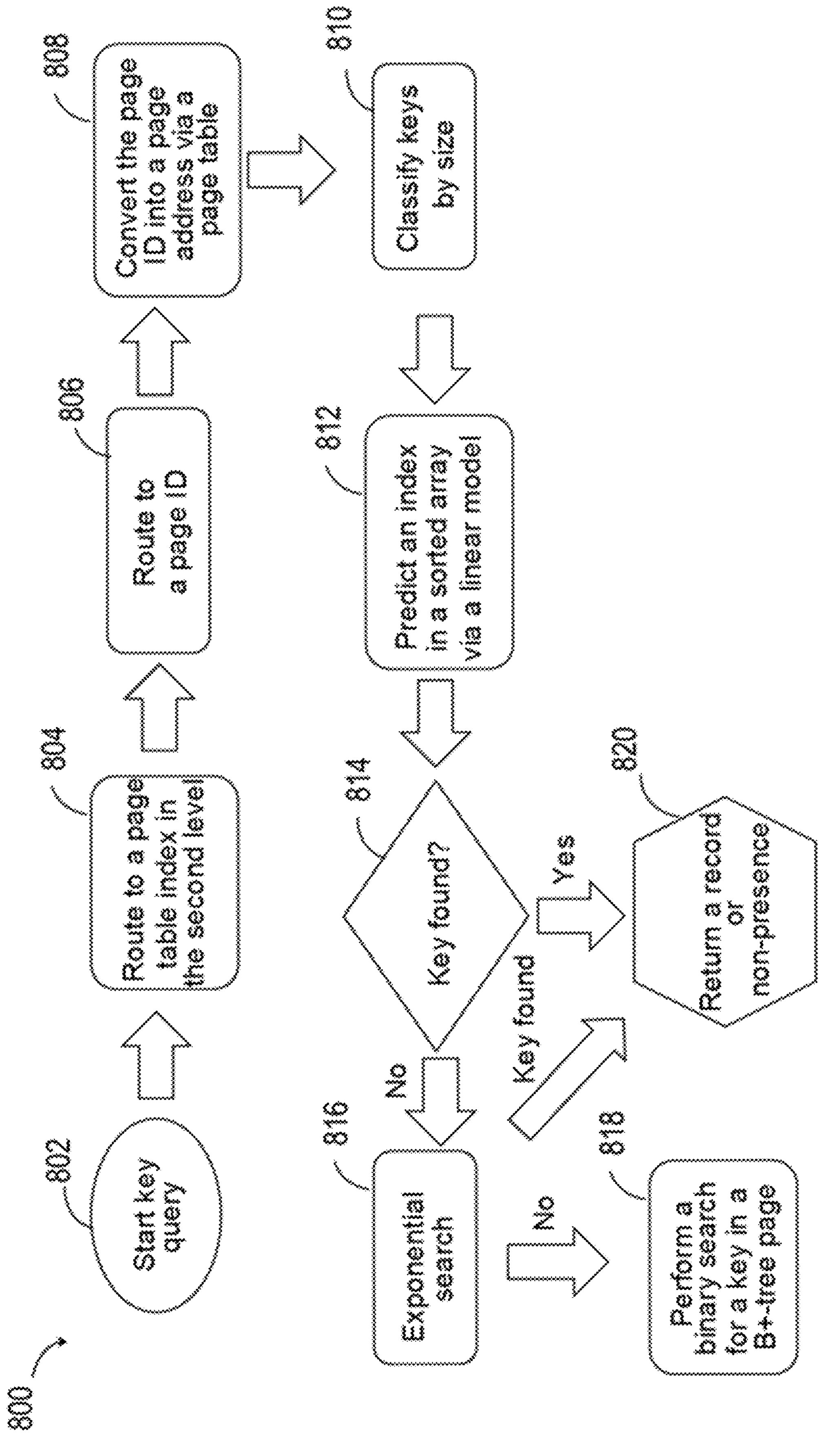
FIG. 8 shows a flow chart of an example of acquiring a key value of a query key according to some embodiments of the present disclosure.

The complete flow of the key query is shown in conjunction with FIG. 8 below. FIG. 8 shows a flow chart of an example 800 of acquiring a key value of a query key according to some embodiments of the present disclosure. In the example 800, a key query is started at block 802, and at block 804, the key query is routed to a page table index, such as the page table index 1 shown in FIG. 5, in the second level by the top-level classifier 502. At block 806, in the page table index, the page classifier 602 routes the key query to a specific page covering the subspace of the query key, such as page 2 shown in FIG. 5. At block 808, the page ID is converted into a physical address corresponding to the page using the page table. At block 810, within the page where the keys are located, the key sizes are predicted by using the key-size correlation model 702, and the keys are classified into classification groups with different slot sizes based on the key sizes.

At block 812, the indexes in the classification group into which the keys are classified are predicted by using the linear model 710, and the keys in the classification group are arranged in order. At block 814, it is determined whether the key is found. If the predicted index is the required key, the operation in block 820 is performed, that is, the record (e.g., key value) corresponding to the key is returned. If the predicted index is not the required key, at block 816, the key at the predicted index is compared with the search key, and an exponential search is performed based on the comparison result to quickly find the key (if the key is present in the classification group). If the required key is found, the operation in block 820 is performed. If the key is not found even after the exponential search, it is determined that it may be an outlier key and stored in a dedicated B+-tree page. At block 818, a binary search is performed in the B+-tree page to acquire the record of the key, and if it is still not found, “none” is returned (or non-presence is returned).

In the embodiments shown in the present disclosure, the machine learning indexing is used in place of the B+-tree indexing, and the B+-tree indexing is regressed to only in a few cases (e.g., where the query keys are not linearly distributed keys or the sizes of the keys are irregular and difficult to predict), and the binary search is avoided in most cases. The machine learning indexing has less storage occupation and higher execution speed, and by including the pre-training step, the training overhead of the machine learning model has been completely removed from the essential key execution path, without any influence on the key query/insertion performance (e.g., which is usually the case for the write-once read-many loading mode). The use of page tables in the middle index level avoids the direct key look-up in the storage space and reduces the complexity of key look-up. In a word, the method of key value acquisition shown in the present disclosure reduces the metadata overhead of key value storage and the execution time of key query, and enables the key value storage to be persistent on various media.

Figure 9:
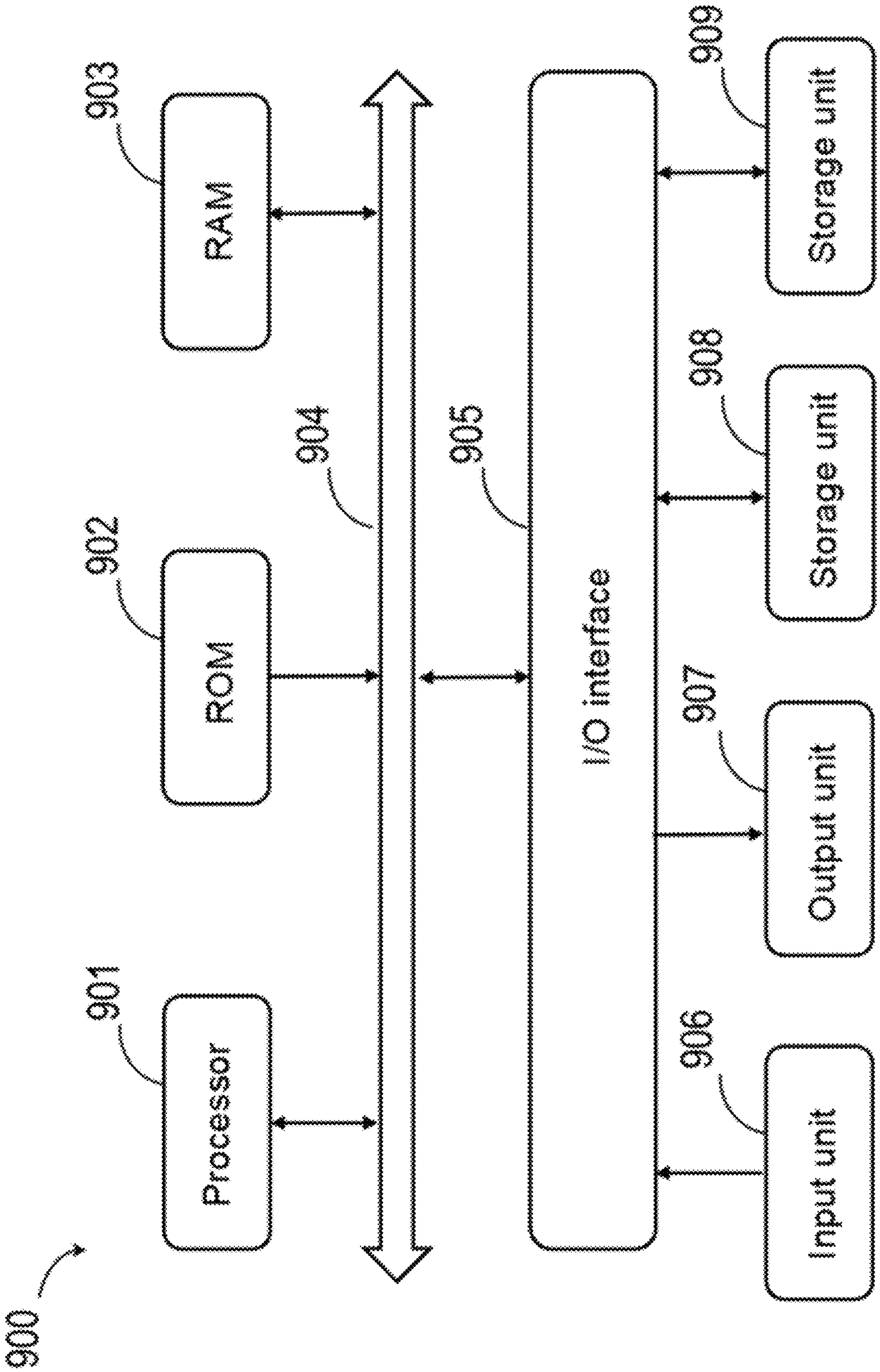
FIG. 9 shows a schematic block diagram of an example device suitable for implementing example embodiments of the present disclosure.

FIG. 9 illustrates a schematic block diagram of an example device 900 which may be used to implement the embodiments of the present disclosure. As shown in the figure, the device 900 includes a processor 901 that can perform various appropriate actions and processing according to computer program instructions stored in a read-only memory (ROM) 902 or computer program instructions loaded from a storage unit 908 to a random access memory (RAM) 903. Various programs and data required for the operation of the device 900 may also be stored in the RAM 903. The processor 901, the ROM 902, and the RAM 903 are connected to each other through a bus 904. An input/output (I/O) interface 905 is also connected to the bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. The communication unit 909 allows the device 900 to exchange information/data with other devices via a computer network, such as the Internet, and/or various telecommunication networks.

The processor 901 may be a variety of general-purpose and/or specialized processing components with processing and computing capabilities. Some examples of the processor 901 include, but are not limited to, a central processing unit (CPU), a graphics processing unit (GPU), various specialized artificial intelligence (AI) computing chips, various processors for running machine learning model algorithms, a digital signal processor (DSP), and any appropriate processor, controller, microcontroller, and the like. The processor 901 performs the various methods and processing described above, such as the method 400. For example, in some embodiments, the method 400 may be implemented as a computer software program that is tangibly included in a machine-readable medium such as the storage unit 908. In some embodiments, part or all of the computer program may be loaded and/or installed into the device 900 via the ROM 902 and/or the communication unit 909. When the computer program is loaded into the RAM 903 and executed by the processor 901, one or more steps of the method 400 described above may be performed. Alternatively, in other embodiments, the processor 901 may be configured to perform the method 400 by any other suitable means (e.g., with the aid of firmware).

The functions described hereinabove can be performed at least in part by one or more hardware logic components. For example, non-restrictively, demonstration types of hardware logic components that can be used include Field Programmable Gate Arrays (FPGAs), Application Specific Integrated Circuits (ASICs), Application Specific Standard Products (ASSPs), Systems On Chip (SOC), Load Programmable Logic Devices (CPLDs), etc.

Program codes for implementing the method of the present disclosure may be written by using one programming language or any combination of multiple programming languages. The program codes may be provided to a processor or controller of a general purpose computer, a special purpose computer, or another programmable data processing apparatus, such that the program codes, when executed by the processor or controller, cause the functions/operations specified in the flow charts and/or block diagrams to be implemented. The program codes may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. Additionally, although operations are depicted in a particular order, it should be understood that such operations are required to be performed in the particular order shown or in a sequential order, or that all illustrated operations should be performed to achieve desirable results. In certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. In contrast, various features that are described in the context of a single implementation may also be implemented in multiple implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method, comprising:

determining, by a system comprising at least one processor, a page table and a page identifier (ID) corresponding to the query key based on an attribute of a query key;

determining a storage address for a page corresponding to the page ID based on the page table and the page ID;

determining a storage address for the query key based on the query key and the page at the storage address, wherein a size of the query key is determined based on a first attribute of the query key, and the query key is classified into a corresponding classification group in the page based on the size of the query key; and acquiring a key value of the query key based on the storage address for the query key.

2. The method according to claim 1, wherein determining the page table and the page ID corresponding to the query key based on the attribute of the query key comprises:

determining an index of the page table corresponding to the query key based on a first attribute of the query key;

determining the page table corresponding to the query key based on the index; and determining the page ID corresponding to the query key based on a second attribute of the query key.

3. The method according to claim 1, wherein determining the storage address for the page corresponding to the page ID based on the page table and the page ID comprises:

mapping the page ID to the storage address for the page corresponding to the page ID via the page table.

4. The method according to claim 1, wherein determining the storage address for the query key based on the query key and the page at the storage address comprises:

determining the index of the query key in the corresponding classification group based on a second attribute of the query key; and determining the storage address for the query key based on the index.

5. The method according to claim 4, wherein determining the index of the query key in the corresponding classification group based on the second attribute of the query key comprises:

determining a first index of the query key in the classification group based on the second attribute of the query key; and determining the index of the query key in the corresponding classification group based on the first index.

6. The method according to claim 5, wherein determining the index of the query key in the corresponding classification group based on the first index comprises:

comparing the key corresponding to the first index with the query key;

in response to the key corresponding to the first index being determined to be the same as the query key, determining the first index as the index of the query key in the corresponding classification group; or in response to the key corresponding to the first index being determined to be different from the query key, determining the index of the query key in the corresponding classification group using a look-up.

7. The method according to claim 6, wherein determining the index of the query key in the corresponding classification group using the look-up comprises:

searching for the query key exponentially in the corresponding classification group based on a result of the comparing of the key corresponding to the first index and the query key; and determining the index of the query key in the corresponding classification group based on a result of the exponential search.

8. The method according to claim 7, further comprising:

in response to not finding the query key in the classification group, searching for the query key comprising performing a binary search in a page of a balanced multi-way look-up tree index structure; and determining the storage address for the query key based on a result of the binary search.

9. The method according to claim 4, wherein the classification group has a group of storage units with a fixed size, one key value entry is stored in one storage unit, and the keys of the key value entry are arranged in order in the classification group.

10. A device, comprising:

at least one processor; and at least one memory coupled to the at least one processor and having computer executable instructions stored therein which, when executed by the at least one processor, cause the device to perform operations to at least:

determine a page table and a page identifier (ID) corresponding to a query key based on an attribute of the query key;

determine a storage address for a page corresponding to the page ID based on the page table and the page ID;

determine a storage address for the query key based on the query key and the page at the storage address, wherein a size of the query key is determined based on a first attribute of the query key, and the query key is assigned a corresponding classification group in the page based on the size of the query key; and acquire a key value of the query key based on the storage address for the query key.

11. The device according to claim 10, wherein determination of the page table and the page ID corresponding to the query key based on the attribute of the query key comprises instructions to at least:

determine an index of the page table corresponding to the query key based on a first attribute of the query key;

determine the page table corresponding to the query key based on the index; and determine the page ID corresponding to the query key based on a second attribute of the query key.

12. The device according to claim 10, wherein determination of the storage address for the page corresponding to the page ID based on the page table and the page ID comprises an instruction to at least:

map the page ID to the storage address for the page corresponding to the page ID via the page table.

13. The device according to claim 10, wherein determination of the storage address for the query key based on the query key and the page at the storage address comprises instructions to at least:

determine the index of the query key in the corresponding classification group based on a second attribute of the query key; and determine the storage address for the query key based on the index.

14. The device according to claim 13, wherein determination of the index of the query key in the corresponding classification group based on the second attribute of the query key comprises instructions to at least:

determine a first index of the query key in the classification group based on the second attribute of the query key; and determine the index of the query key in the corresponding classification group based on the first index.

15. The device according to claim 14, wherein determination of the index of the query key in the corresponding classification group based on the first index comprises instructions to at least:

compare the key corresponding to the first index with the query key, producing a comparison result;

in response to, based on the comparison result, the key corresponding to the first index being the same as the query key, determine the first index as the index of the query key in the corresponding classification group; or in response to, based on the comparison result, the key corresponding to the first index being different from the query key, determine the index of the query key in the corresponding classification group based on a look-up.

16. The device according to claim 15, wherein determination of the index of the query key in the corresponding classification group based on the look-up comprises instructions to at least:

search for the query key exponentially in the corresponding classification group based on the comparison result between the key corresponding to the first index and the query key, producing an exponential search result; and determine the index of the query key in the corresponding classification group based on the exponential search result.

17. The device according to claim 16, wherein the operations are further performed to at least:

in response to not finding the query key in the classification group, search for the query key based on a binary search in a page of a balanced multi-way look-up tree index structure; and determine the storage address for the query key based on a result of the binary search.

18. A computer program product stored in a non-transitory computer-readable medium and comprising machine-executable instructions which, when executed, cause a machine to perform actions, comprising:

determining a page table and a page identifier (ID) corresponding to a query key based on an attribute of the query key;

determining a storage address for a page corresponding to the page ID based on the page table and the page ID;

determining a storage address for the query key based on the query key and the page at the storage address;

determining a size of the query key based on a first attribute of the query key;

classifying the query key into a corresponding classification group in the page based on the size of the query key; and acquiring a key value of the query key based on the storage address for the query key.

19. The computer program product according to claim 18, wherein the determining of the page table and the page identifier (ID) comprises:

determining an index of the page table corresponding to the query key based on a first attribute of the query key;

determining the page table corresponding to the query key based on the index; and determining the page ID corresponding to the query key based on a second attribute of the query key.

20. The computer program product according to claim 18, wherein the determining of the storage address for the query key based on the query key and the page at the storage address comprises:

determining the index of the query key in the corresponding classification group based on a second attribute of the query key; and determining the storage address for the query key based on the index.

* * * * *